United States Patent
Park

(10) Patent No.: US 8,064,012 B2
(45) Date of Patent: *Nov. 22, 2011

(54) LIQUID CRYSTAL DISPLAY DEVICE

(75) Inventor: Chi Hyuck Park, Daegu (KR)

(73) Assignee: LG Display Co., Ltd., Seoul (KR)

( * ) Notice: Subject to any disclaimer, the term of this patent is extended or adjusted under 35 U.S.C. 154(b) by 277 days.

This patent is subject to a terminal disclaimer.

(21) Appl. No.: 11/384,446

(22) Filed: Mar. 21, 2006

(65) Prior Publication Data

US 2007/0085946 A1    Apr. 19, 2007

(30) Foreign Application Priority Data

Oct. 13, 2005 (KR) .................. 10-2005-0096589

(51) Int. Cl.
*G02F 1/1335* (2006.01)

(52) U.S. Cl. .................................. 349/112; 349/96

(58) Field of Classification Search .......... 349/96, 349/112

See application file for complete search history.

(56) References Cited

U.S. PATENT DOCUMENTS

| | | | | |
|---|---|---|---|---|
| 5,329,386 A * | 7/1994 | Birecki et al. | ................. | 349/63 |
| 5,638,200 A * | 6/1997 | Xu | ................. | 349/117 |
| 5,877,829 A * | 3/1999 | Okamoto et al. | ................. | 349/74 |
| 6,801,281 B2 * | 10/2004 | Huang et al. | ................. | 349/113 |
| 6,873,099 B2 * | 3/2005 | Maeda | ................. | 313/504 |
| 6,882,474 B2 * | 4/2005 | Umemoto et al. | ................. | 359/487 |
| 7,313,309 B2 * | 12/2007 | Numata et al. | ................. | 385/130 |
| 2003/0048400 A1 * | 3/2003 | Kim et al. | ................. | 349/117 |
| 2004/0125275 A1 * | 7/2004 | Kurasawa | ................. | 349/96 |
| 2005/0024565 A1 * | 2/2005 | Hwang et al. | ................. | 349/119 |
| 2006/0072054 A1 * | 4/2006 | Ito | ................. | 349/96 |
| 2007/0146271 A1 * | 6/2007 | Park | ................. | 345/89 |

* cited by examiner

*Primary Examiner* — Mark Robinson
*Assistant Examiner* — Charles Chang
(74) *Attorney, Agent, or Firm* — Morgan, Lewis & Bockius LLP

(57) ABSTRACT

A liquid crystal display device includes a liquid crystal display panel; a first polarizer on a first surface of the liquid crystal display panel; a second polarizer on a second surface of the liquid crystal display panel; and a first light path control film on a first surface of the second polarizer to refract the light polarized by the second polarizer to a direction minimizing a gray inversion on a display surface of the liquid crystal display panel.

8 Claims, 19 Drawing Sheets

< OFF − STATE >

< ON - STATE >

GRAY INVERSION SCREEN

NORMAL SCREEN

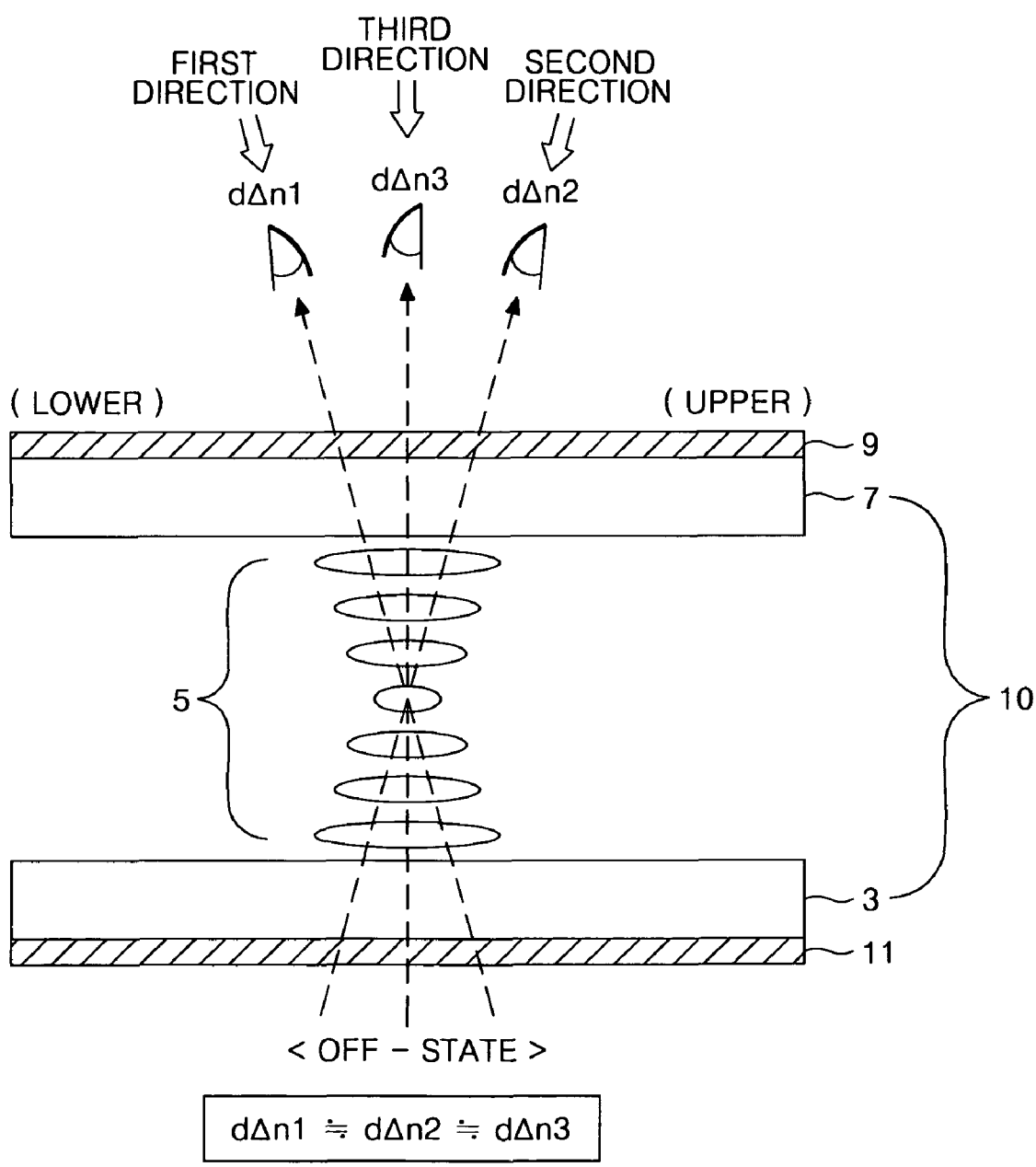

< ON - STATE >

< ON – STATE >

LIQUID CRYSTAL DISPLAY DEVICE

This application claims the benefit of the Korean Patent Application No. 2005-0096589 filed in Korea on Oct. 13, 2005, which is hereby incorporated by reference in its entirety.

BACKGROUND OF THE INVENTION

1. Field of the Invention

The present invention relates to a liquid crystal display device, and more particularly to a liquid crystal display device and a method of fabricating the same that reduces a gray inversion phenomenon.

2. Description of the Related Art

A liquid crystal display LCD device displays a picture by controlling an electric field applied to a liquid crystal cell to modulate the light incident to the liquid crystal cell. Depending on the direction of the applied electric field driving the liquid crystal, a liquid crystal display device is broadly classified as a vertically applied electric field type or a horizontally applied electric field type.

In the vertically applied electric field type of LCD device, a pixel electrode and a common electrode are formed in an upper substrate and a lower substrate facing each other in a vertical direction. A vertical electric field is generated by applying a voltage to the pixel and common electrodes. Twisted nematic (hereinafter, referred to as "TN") mode LCD is an example of the vertical electric field type LCD. Most of the current liquid crystal display devices use the TN mode.

FIG. 1A is a schematic view of a liquid crystal display panel of a related art twisted nematic mode LCD in an off-state. FIG. 1B is a schematic view of a liquid crystal display panel of the related art twisted nematic mode LCD in an on-state. Referring to FIGS. 1A and 1B, a TN mode LCD panel 10 includes an upper substrate 7 and a lower substrate 3. A liquid crystal layer 5 is provided between the upper substrate 7 and the lower substrate 3. A pixel electrode (not shown) and a common electrode (not shown) are formed in the upper substrate 7 and the lower substrate 3, respectively. For the sake of explanation, FIGS. 1A and 1B show the shapes of the liquid crystal molecules when seen from a three o'clock direction.

An upper polarizer 9 is adhered to a light exit surface of the upper substrate 7. A lower polarizer 11 is adhered to a light incidence surface of the lower substrate 3. The upper polarizer 9 has a light transmission axis of a first direction. The lower polarizer 11 has a light transmission axis perpendicularly to the light transmission axis of the upper polarizer 9.

The TN mode LCD can be operated in a normally white mode. As shown in FIG. 1A, when a voltage is not applied between the pixel electrode in the upper substrate 7 and the common electrode in the lower substrate 3, the TN mode LCD is in an off-state. The local optical axes (director) of the liquid crystal molecules are continuously twisted by 90° between the upper substrate 7 and the lower substrate 3 in the off-state. In the off-state, the polarization state of a linearly polarized light which is incident through the lower polarizer 11 changes while passing through the liquid crystal layer 5 to allow transmission of the polarized light through the upper polarizer 9.

In contrast, when a voltage is applied between the pixel electrode in the upper substrate 7 and the common electrode in the lower substrate 3, the TN mode LCD is in an on-state and an electric field is generated in the liquid crystal. As shown in FIG. B, the optical axis of the middle part of the liquid crystal layer 5 becomes parallel to the generated electric field. The variation in applied voltage between the pixel electrode (not shown) and the common electrode (not shown) from the off-state to the on-state releases the twisted structure in the TN mode LCD. In the on-state, the linearly polarized light incident through the lower polarizer 11 maintains its polarization state while passing through the liquid crystal layer 5 to block transmission of the polarized light through the upper polarizer 9.

The vertical electric field type LCD can provide a relatively broad aperture ratio. The TN mode also has a high transmissivity, and is relatively easy to produce. However, the vertical electric field type LCD typically provides a narrow viewing angle. Moreover, the vertical electric field type LCD can suffer from a gray inversion phenomenon appearing at a lower viewing angle, for example, at lower part of the liquid crystal display panel.

FIG. 2 is a graphical view of experimental data representing changes in gray level in accordance with a viewing angle. As shown in FIG. 2, the gray inversion phenomenon causes a dark gray level to appear brighter than a bright gray level at a lower viewing angle. FIG. 3 is a photograph which compares a gray inversion screen and a normal screen. As shown in FIG. 3, the quality of the picture based on the gray inversion is quite distorted from the normal picture. A main cause for the generation of the gray inversion is a variation of refractive index in accordance with the viewing angle.

FIG. 4A is a schematic view of a variation in birefringence depending on viewing angles when the related art twisted nematic mode LCD panel is in the off-state. The birefringence of a liquid crystal layer having a thickness "d" and a refractive index "Δn" is defined as "dΔn." As shown in FIG. 4A, a TN mode LCD panel 10 has a birefringence dΔn1 in a first viewing direction corresponding to a lower viewing angle in which a user faces the screen from the lower part of the panel 10. The TN mode LCD panel 10 has a birefringence dΔn2 in a second viewing direction corresponding to an upper viewing angle in which the user faces the screen from the upper part of the panel. The TN mode LCD panel 10 has a birefringence dΔn3 corresponding to a third viewing direction in which the user faces the screen from the front part of the panel. When the TN mode liquid crystal display panel 10 is in the off-state, there is almost no change in the birefringence dΔn1 in the first viewing direction, the birefringence dΔn2 in the second viewing direction, and the birefringence dΔn3 in the third viewing direction.

FIG. 4B is a schematic view of a variation in birefringence depending on viewing angles when the related art twisted nematic mode LCD panel is in the on-state. As shown in FIG. 4B, when the TN mode LCD panel is in the on-state, an average director (A) of the liquid crystal is tilted around an axis at a crossing of the first and third viewing directions. Thus, the birefringence dΔn of the light passing through the liquid crystal changes in accordance with the viewing angle. Specifically, the birefringence in the first, second and third viewing directions follows the relation of dΔn1<dΔn2<dΔn3. As shown in FIG. 4B, the short axis of the liquid crystal is observed in the first viewing direction, and longer axes are observed in the second and third viewing directions. Thus, the desired gray level is achieved in the first viewing direction, but brighter or dimmer gray levels appear in the second and third viewing directions as the dΔn value become higher, in accordance with the P1 area in FIG. 2.

As shown in FIG. 4B, when the user sees the screen from a fourth direction at a lower viewing angle than the first viewing direction, the birefringence dΔn4 in the fourth direction becomes higher than the birefringence dΔn1 in the first viewing direction. Thus, the gray level in the fourth direction appears to be brighter than the gray level in the first viewing direction, in accordance with the P2 area in FIG. 2.

FIG. 5 is a schematic diagram of a gray inversion generation on the related art twisted nematic mode LCD panel. As shown in FIG. 5, a zero point where the refractive index Δn of the average director of the liquid crystal becomes theoretically "0" is a peak. The birefringence dΔn of a dark gray level is higher than the birefringence dΔn of a bright gray level at a viewing angle lower than the zero point and corresponding to a lower part of the panel. Such a phenomenon appears on the screen as a gray inversion.

SUMMARY OF THE INVENTION

Accordingly, the present invention is directed to a liquid crystal display device that substantially obviate one or more of the problems due to limitations and disadvantages of the related art.

An object of the present invention is to provide a liquid crystal display device that provides an improved picture quality.

Another object of the present invention is to provide a liquid crystal display device that reduces a gray inversion phenomenon.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the present invention, as embodied and broadly described herein, a liquid crystal display device includes a liquid crystal display panel; a first polarizer on a first surface of the liquid crystal display panel; a second polarizer on a second surface of the liquid crystal display panel; and a first light path control film on a first surface of the second polarizer to refract the light polarized by the second polarizer to a direction minimizing a gray inversion on a display surface of the liquid crystal display panel.

In another aspect, a liquid crystal display device includes a liquid crystal display panel; a first polarizer on a first surface of the liquid crystal display panel to polarize a light incident to the liquid crystal display panel; a second polarizer on a second surface of the liquid crystal display panel to polarize the light transmitted through the liquid crystal display panel; a first light path control film on a first surface of the first polarizer to refract the light incident onto the first polarizer; and a second light path control film on a first surface of the second polarizer to refract the light polarized by the second polarizer to a direction minimizing a gray inversion on a display surface of the liquid crystal display panel.

In another aspect, a liquid crystal display device includes a liquid crystal display panel including a liquid crystal tilted at a direction corresponding to an average director of the liquid crystal; a polarizer located in an exit surface of the liquid crystal display panel to polarize the light transmitted through the liquid crystal display panel; and a first light path control film located on a first surface of the polarizer to refract the polarized light toward a direction minimizing a gray inversion on a display surface of the liquid crystal display panel at an angle smaller than an angle of the average director.

In another aspect, a method of fabricating a liquid crystal display device including a liquid crystal panel and a liquid crystal in the liquid crystal panel includes tilting a liquid crystal at a direction corresponding to an average director; polarizing a light transmitted through the liquid crystal display panel at an exit surface of the liquid crystal display panel; and refracting the polarized light toward a direction minimizing a gray inversion on a display surface of the liquid crystal display panel at an angle lower than an angle of the average director.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 4A is a schematic view of a variation in birefringence depending on viewing angles when the related art twisted nematic mode LCD panel is in the off-state;

DETAILED DESCRIPTION OF THE PREFERRED EMBODIMENTS

Reference will now be made in detail to the preferred embodiments of the present invention, examples of which are illustrated in the accompanying drawings.

Figure 1A:
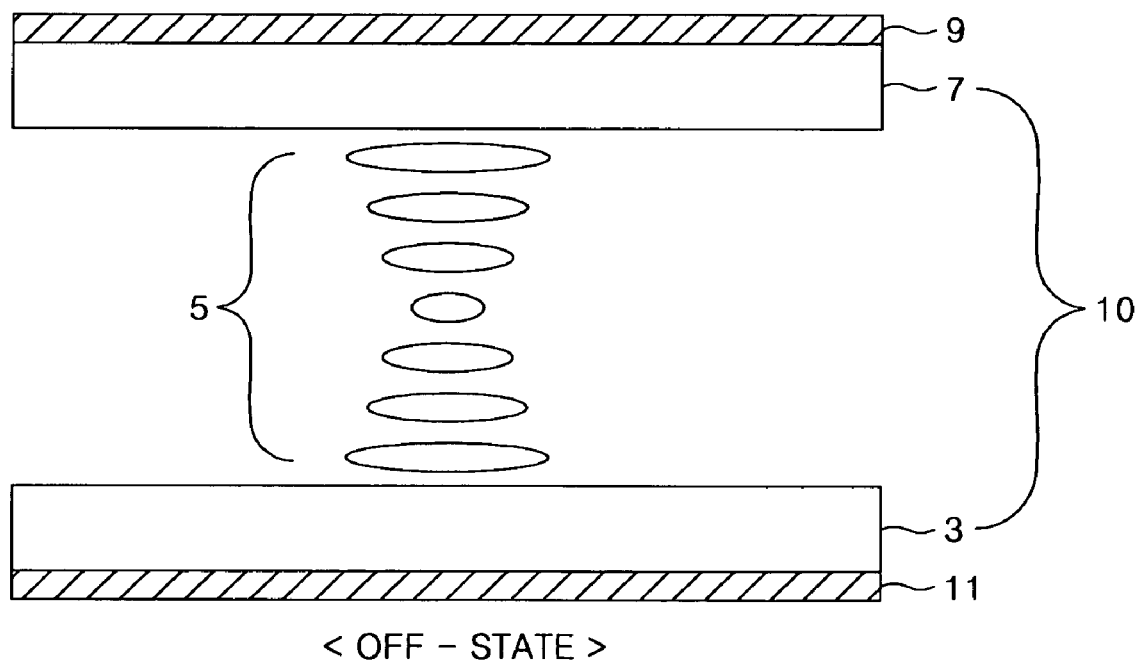
FIG. 1A is a schematic view of a liquid crystal display panel of a related art twisted nematic mode LCD in an off-state.
Figure 1B:
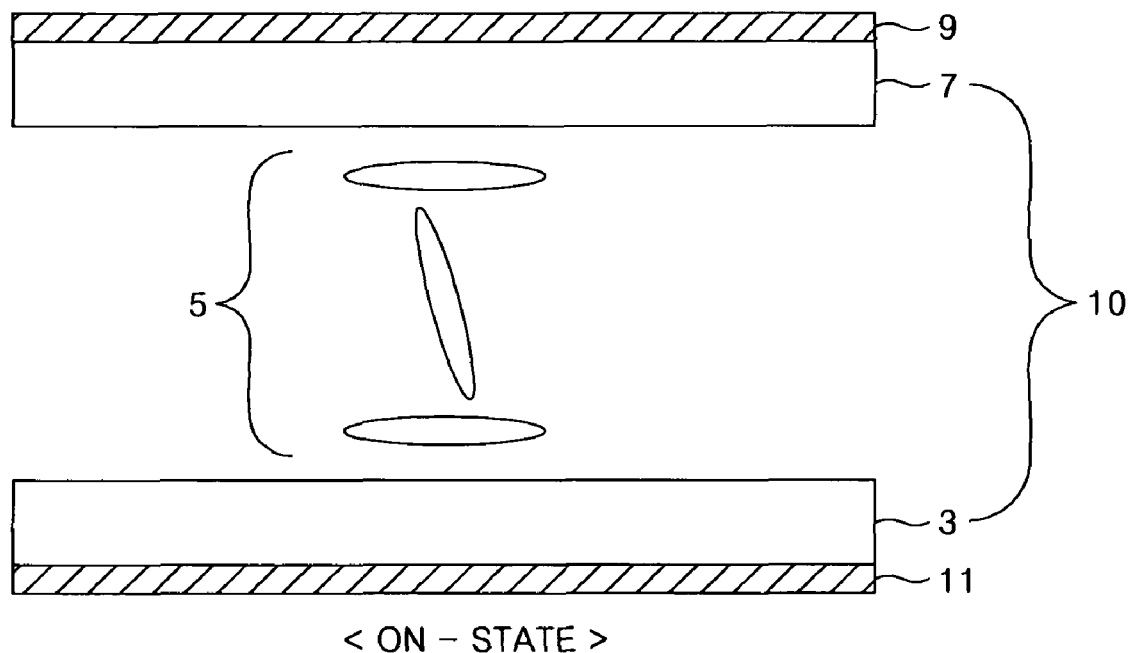
FIG. 1B is a schematic view of a liquid crystal display panel of the related art twisted nematic mode LCD in an on-state.
Figure 2:
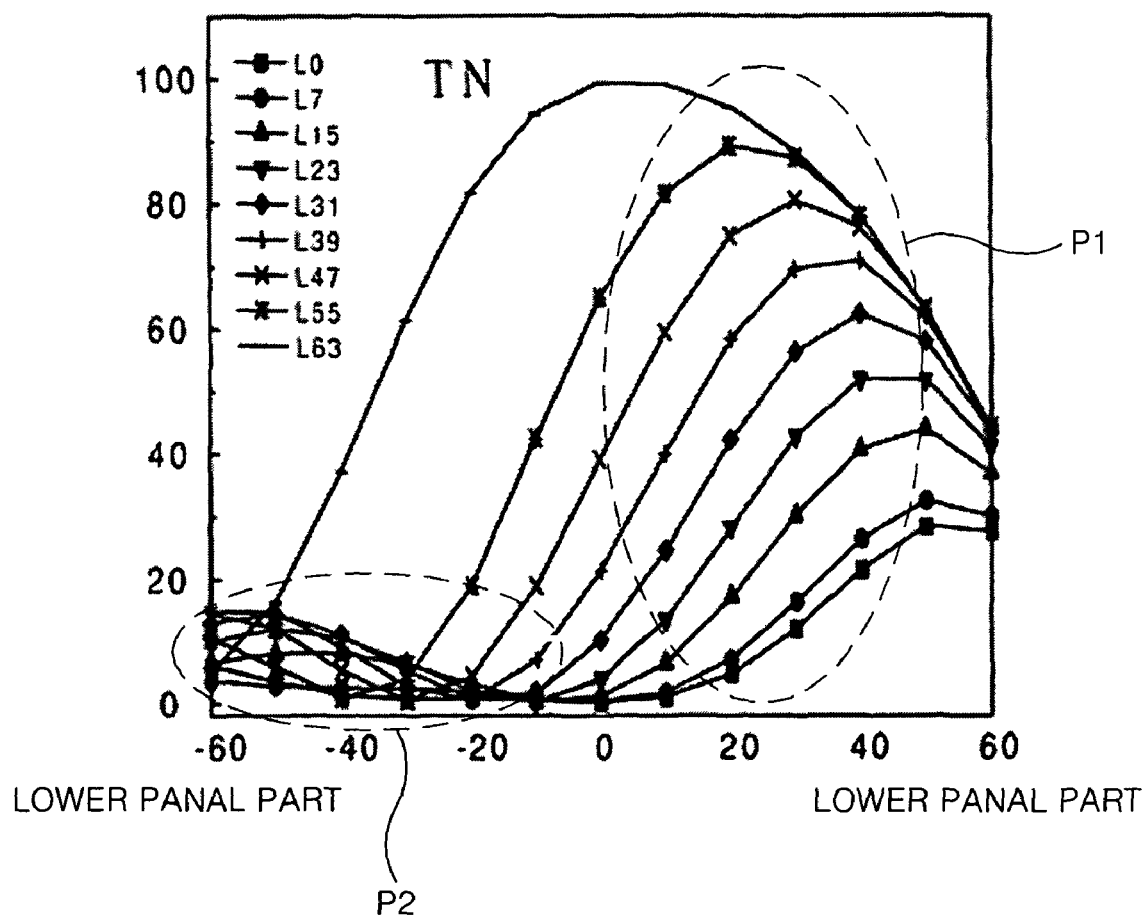
FIG. 2 is a graphical view of experimental data representing changes in gray level in accordance with a viewing angle in the related art twisted nematic mode LCD panel.
Figure 3:
FIG. 3 is a photograph which compares a gray inversion screen and a normal screen the related art twisted nematic mode LCD panel.
Figure 3:
Figure 4B:
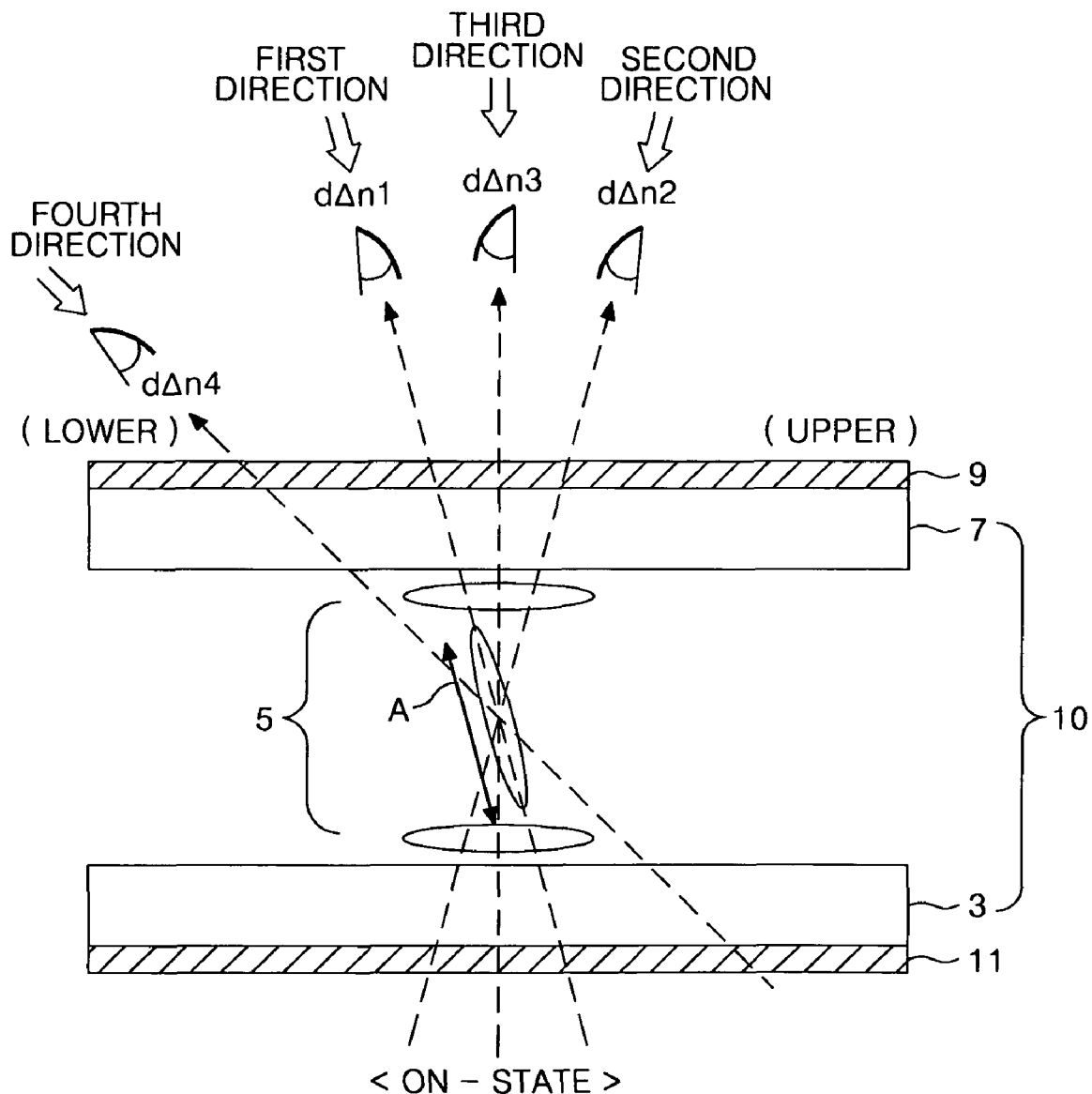
FIG. 4B is a schematic view of a variation in birefringence depending on viewing angles when the related art twisted nematic mode LCD panel is in the on-state.
Figure 5:
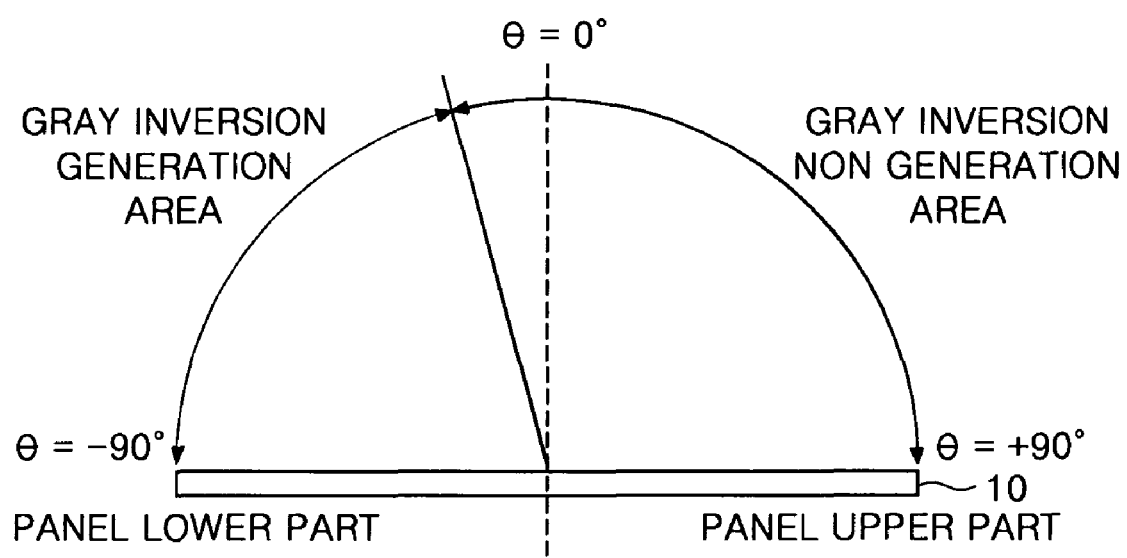
FIG. 5 is a schematic diagram of a gray inversion generation on the related art twisted nematic mode LCD panel.
Figure 6A:
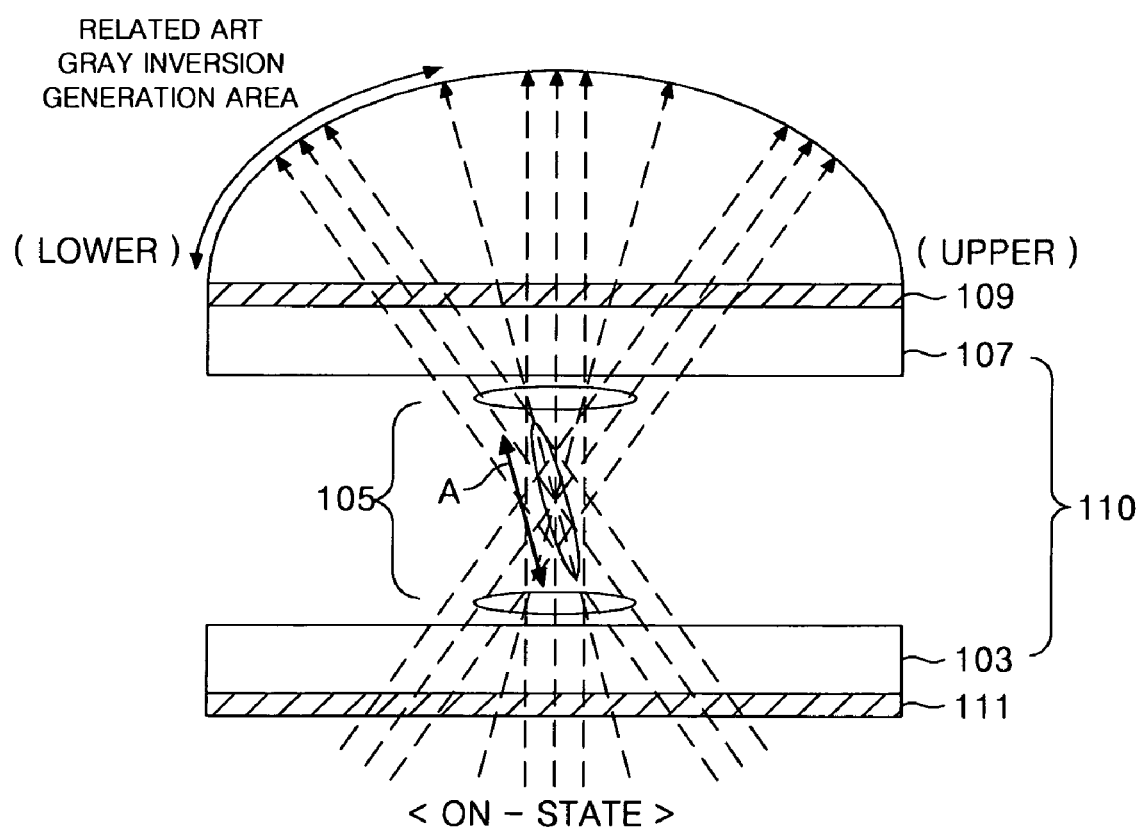
FIG. 6A is a schematic view of a gray inversion generation area on a twisted nematic mode LCD panel art in the on-state.

FIG. 6A is a schematic view of a gray inversion generation area on a twisted nematic mode LCD panel art in the on-state. Referring to FIG. 6A, light propagates from a lower polarizer 111 through a lower substrate 103, a liquid crystal 105, an upper substrate 107 and an upper polarizer 109. When the TN mode LCD panel 110 is in the on-state, an average director A of the liquid crystal 105 is tilted around an axis at a crossing of various light paths. The birefringence of the light passing through the liquid crystal changes in accordance with a viewing angle. Specifically, longer or shorter axes of a liquid crystal cell 105 are perceived depending on the viewing direction. Thus, a desired gray level is achieved in a viewing direction A where a short axis of the liquid crystal cell 105 is perceived, but brighter or dimmer gray levels appear in the other viewing directions where a longer axis of the liquid crystal cell 105 is observed. The variation in birefringence generates a gray inversion when the viewing angle is lower than the angle of the average director A of the liquid crystal 105, as shown in the gray inversion generation area of FIG. 6A.

Figure 6B:
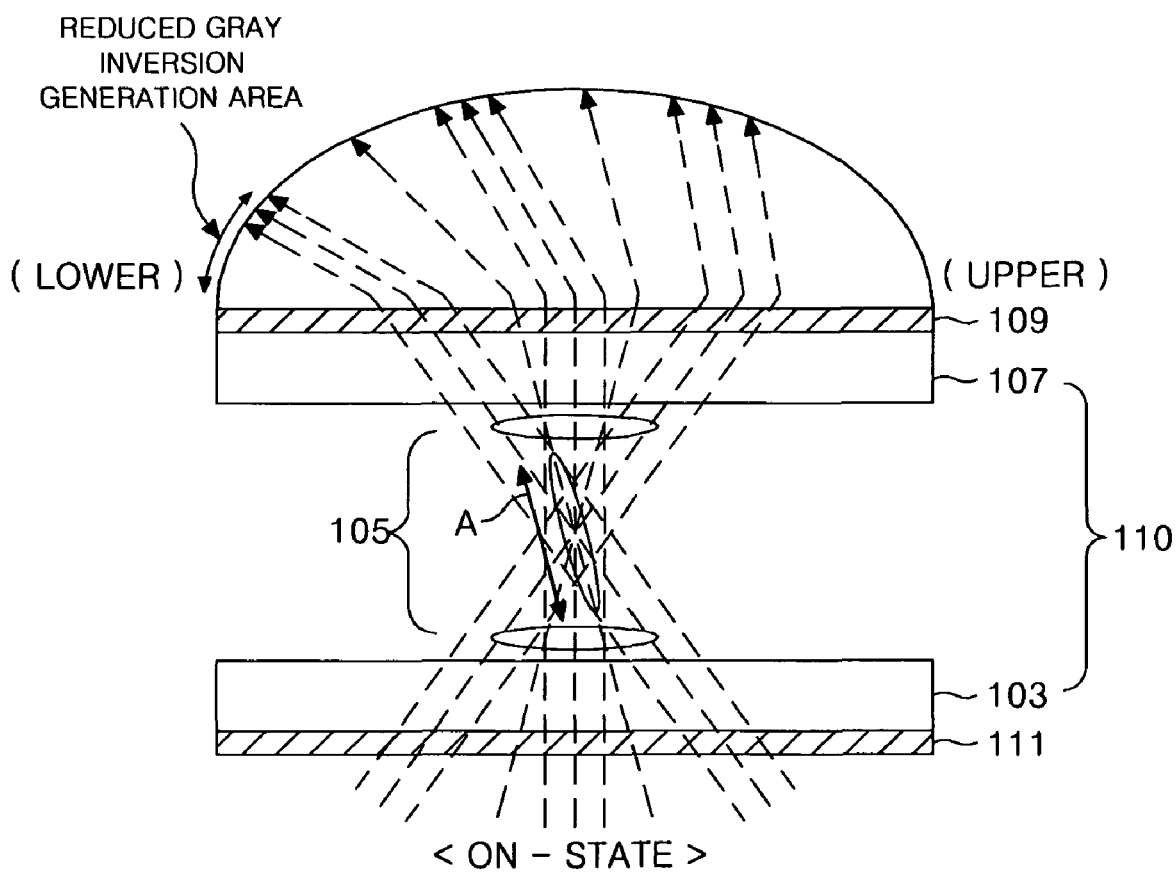
FIG. 6B is a schematic view describing a method for reducing the gray inversion generation area of FIG. 6A.

FIG. 6B is a schematic view describing a method for reducing the gray inversion generation area of FIG. 6A. As shown in FIG. 6B, the light transmitted through a liquid crystal display panel 110 and exiting from the upper polarizer 109 is refracted toward a lower direction of the LCD panel 110. Accordingly, the light transmitted in a short axis direction of an average director A of the liquid crystal 105 is refracted in the lower direction of the liquid crystal display panel 110 at the exit surface of the LCD panel 110. Thus, the light transmitted in the short axis direction of the average director A is perceived even at a lower viewing angle. As a result, as shown in FIG. 6B, the viewable gray inversion generation area is reduced in comparison to the related art gray inversion generation area shown in FIG. 6A. Accordingly, the picture quality is improved.

Figure 7:
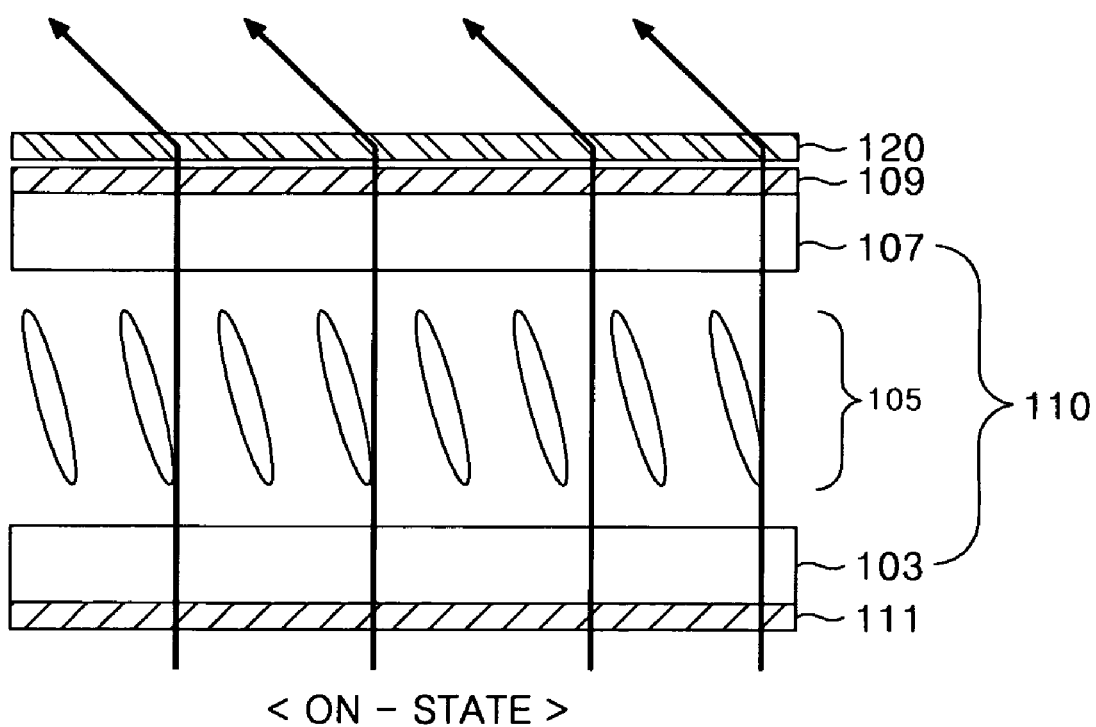
FIG. 7 is a schematic view of an exemplary liquid crystal display device according to a first embodiment of the present invention.

FIG. 7 is a schematic view of an exemplary liquid crystal display device according to a first embodiment of the present invention. Referring to FIG. 7, a liquid crystal display device includes a TN mode LCD panel 110 having an upper substrate 107 and a lower substrate 103 with a liquid crystal layer 105 between the lower and upper substrates 103 and 107. An upper polarizer 109 is adhered to a light exit surface of the upper substrate 107, and a lower polarizer 111 is adhered to a light incidence surface of the lower substrate 103. The upper polarizer 109 can be an analyzer. The upper polarizer 109 has a light transmission axis in a first direction. The lower polarizer 111 has a light transmission axis perpendicularly to the light transmission axis of the upper polarizer 109.

A light path control film 120 is formed on the outer surface of the upper polarizer 109. The light path control film 120 can be, for example, an optical layer. The light path control film 120 controls the light transmitted through the liquid crystal display panel 110. For example, the light path control film 120 refracts light in a fixed angle.

In contrast, when a voltage is applied between a pixel electrode (not shown) in the upper substrate 107 and a common electrode (not shown) in the lower substrate 103, the TN mode LCD is in a on-state and an electric field is generated in the liquid crystal 105. The optical axis of the middle part of the liquid crystal layer 105 becomes parallel to the generated electric field. An average director of the liquid crystal 105 can be slightly tilted around an axis, as shown in FIG. 7. The variation in applied voltage between the pixel electrode (not shown) and the common electrode (not shown) from the off-state to the on-state releases the twisted structure in the TN mode LCD. In the on-state, the linearly polarized light incident through the lower polarizer 111 maintains its polarization state while passing through the liquid crystal layer 105 to block transmission of the polarized light through the upper polarizer 109, thereby realizing black (in case of a normally white display).

As shown in FIG. 7, the light transmitted through the upper polarizer 107 is refracted by the light path control film 120 in a lower direction on a display surface of the liquid crystal display panel 110. Accordingly, the light transmitted in a short axis direction of the average director of the liquid crystal 105 is refracted in the lower direction on the display surface of the panel 110 in the exit surface of the liquid crystal display panel 110. Thus, the light transmitted in the short axis direction of the average director can be perceived even at a lower viewing angle.

Figure 8:
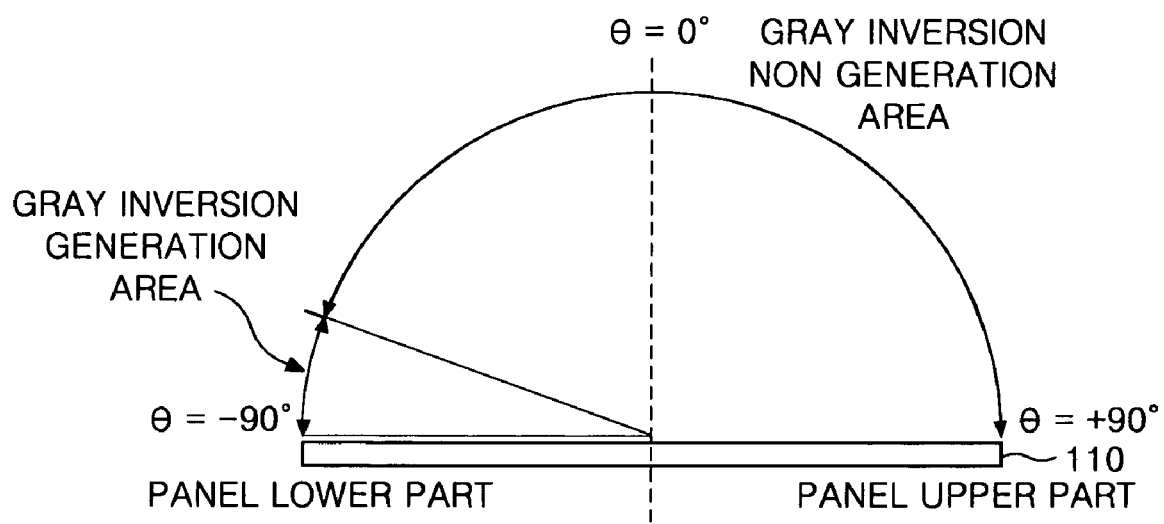
FIG. 8 is a schematic diagram of a reduced gray inversion generation area on the twisted nematic mode LCD panel of FIG. 7.

FIG. 8 is a schematic diagram of a reduced gray inversion generation area on the twisted nematic mode LCD panel of FIG. 7. The light path control film 120 controls the light transmitted through the liquid crystal display panel 110 by refracting the light exiting from the LCD panel 110 at a fixed angle. Thus, as shown in FIG. 8, the viewable gray inversion generation area is reduced in comparison to the related art gray inversion generation area.

Figure 9A:
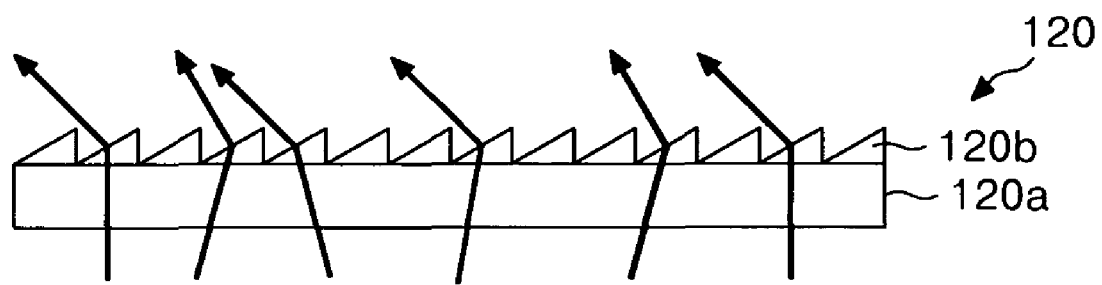
FIG. 9A is a cross-sectional view of an exemplary light path control film for the LCD device of FIG. 7.

FIG. 9A is a cross-sectional view of an exemplary light path control film for the LCD device of FIG. 7. Referring to FIG. 9A, the light path control film 120 includes a base material 120a and a prism 120b having a triangular shape on the base material 120a. The prism 120b has an inclined plane in a refractive direction.

The base material 120a can be made of a transparent plastic material. The prism 120b can also be made of a transparent plastic material. In embodiments of the present invention, the base material 120a and the prism 120b can be made of one of PMMA (polymethylmethacrylate), vinyl chloride, acrylic resin, PC (polycarbonate) system, PET (polyethylene therephtalate) system, PE (polyethylene) system, PS (polystryrene) system, PP (polypropylene) system, PI (polyimide) system resin, glass, silica, etc.

Generally, the refractive index of PMMA is about 1.49, the refractive index of PC is about 1.53, the refractive index of PS is about 1.58, the refractive index of PP is about 1.49, the refractive index of PET is about 1.57, and the refractive index of PS is about 1.59. The light path control film 120 can be made by an appropriate combination of the above-mentioned materials or by an appropriate combination with the refractive index (1.0) of air.

Further, the refractive index of each of the above-mentioned materials varies in accordance with wavelength and depends on the shape and number of benzene rings and the double bonds of resin monomers. Minute adjustment of the refractive index of the resin can be achieved by controlling those parameters. For example, the double bond and triple bond or a strong polar group can be doped to control the refractive index.

The operation of the prism 120a involves refraction and reflection in accordance with Snell's law due to a difference between the refractive index of air and the refractive index of resin. Accordingly, the light path can be controlled as much as required based on the shape of the pattern of the prism 120a and the angle of the inclined surface of the prism 120a.

In embodiments of the present invention, the base material 120a can be distinct from the triangular prism 120b. Alternatively, the triangular prism 120b can be integrally formed on the base material 120a by partially etching the upper portion of the base material. Further, the base material can be omitted to form a light path control film 120 including only the triangular prism 120b.

Figure 9B:
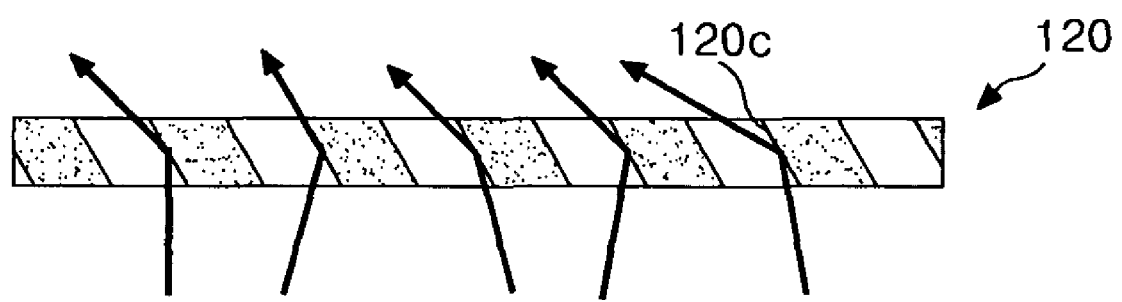
FIG. 9B is a cross-sectional view of another exemplary light path control film for the LCD device of FIG. 7.

FIG. 9B is a cross-sectional view of another exemplary light path control film for the LCD device of FIG. 7. Referring to FIG. 9B, the light path control film 120 can be made by depositing two or more layers of materials having adjacently different refractive indices, and cutting the plurality of layers along a slanted line. Accordingly, the boundaries between adjacent regions of different refractive indices form slanted lines 120c. The difference in refractive index between adjacent regions enables controlling of the light path.

Figure 10:
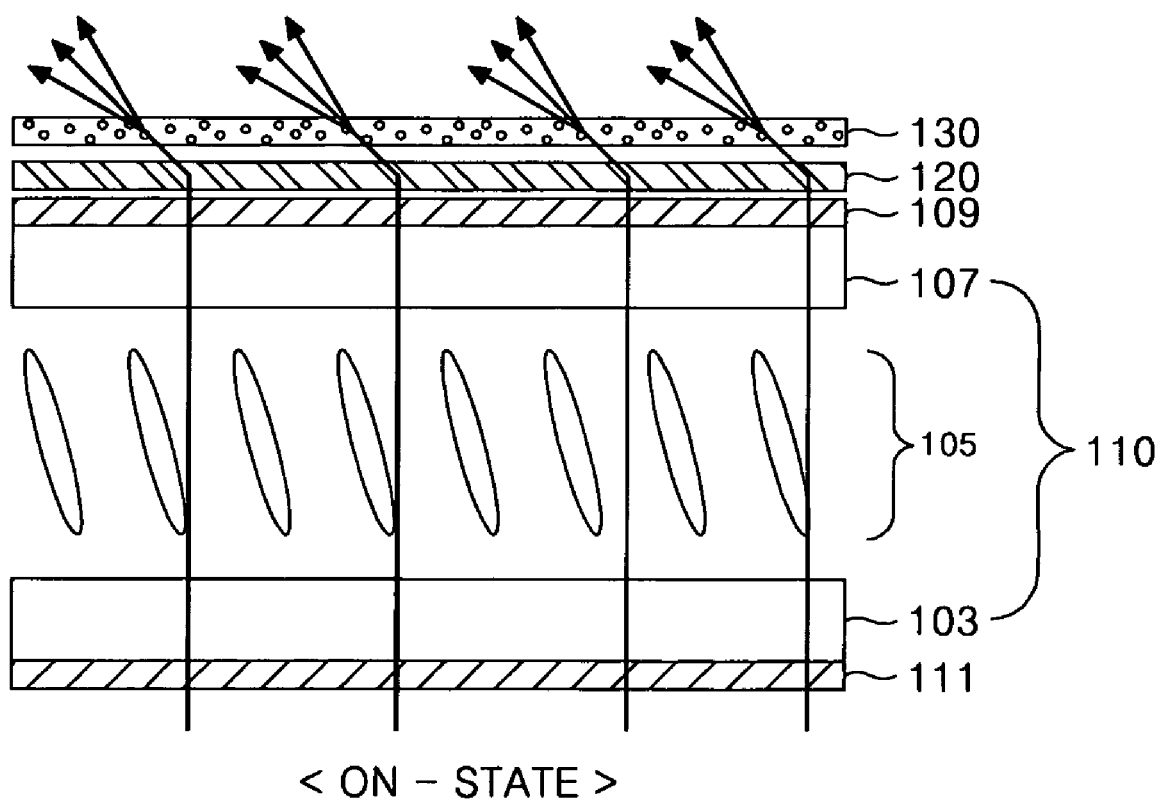
FIG. 10 is a schematic view of an exemplary liquid crystal display device according to a second embodiment of the present invention.

FIG. 10 is a schematic view of an exemplary liquid crystal display device according to a second embodiment of the present invention. Referring to FIG. 10, a liquid crystal display device includes a TN mode LCD panel 110 having an upper substrate 107 and a lower substrate 103 with a liquid crystal layer 105 between the lower and upper substrates 103 and 107. An upper polarizer 109 is adhered to a light exit surface of the upper substrate 107, and a lower polarizer 111 is adhered to a light incidence surface of the lower substrate 103.

A light path control film 120 is formed on the outer surface of the upper polarizer 109. The light path control film 120 controls the light transmitted through the liquid crystal display panel 110. For example, the light path control film 120 refracts light in a fixed angle.

A light dispersion processing layer 130 is provided on the light path control film 120. The light dispersion processing layer 130 distributes and disperses the light refracted by the light path control film 120. The light dispersion processing layer 130 includes a dispersing agent, such as a plurality of beads, and a binder to hold the beads. The binder is generally made of acrylic system or epoxy system.

The optical characteristics of the light dispersion processing layer 130 can be controlled by selecting an appropriate material for the beads to achieve a specific refractive index, and by selecting an appropriate size and a grain size distribution for the beads. For example, the beads can be made of an inorganic material, such as silica, or an organic material, such as polymethylmethacrylate (PMMA). Moreover, materials having various refractive indices can be combined to adjust the optical characteristics of the light dispersion processing layer 130.

In an embodiment, the beads of the same size and the same refractive index can be evenly distributed within the light dispersion processing layer 130. In another embodiment, beads having at least two different sizes can be mixed and distributed within the light dispersion processing layer 130. In still another embodiment, beads having different refractive indices can be mixed and distributed within the light dispersion processing layer 130. In yet another embodiment, beads having different refractive indices and/or different sizes can be mixed and distributed within the light dispersion processing layer 130.

Figure 11A:
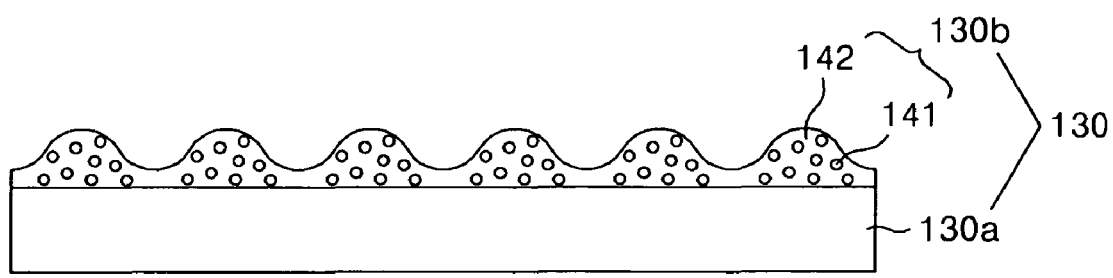
FIG. 11A is a cross-sectional view of an exemplary light dispersion processing layer for the LCD device of FIG. 10.

FIG. 11A is a cross-sectional view of an exemplary light dispersion processing layer for the LCD device of FIG. 10. Referring to FIG. 11A, the light dispersion processing layer 130 includes a base material 130a and a dispersion layer 130b on the base material 130a. The dispersion layer 130b includes a plurality of beads 141 acting as dispersing agents and a binder 142 for holding the beads 141.

Figure 11B:
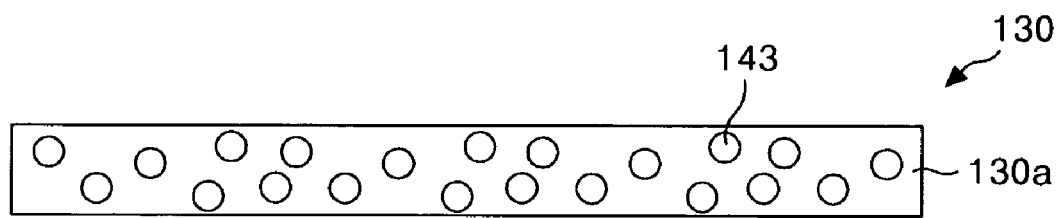
FIG. 11B is a cross-sectional view of another exemplary light dispersion processing layer for the LCD device of FIG. 10.

FIG. 11B is a cross-sectional view of another exemplary light dispersion processing layer for the LCD device of FIG. 10. Referring to FIG. 11B, the light dispersion processing layer 130 includes a base material 130a and a plurality of large beads 143 distributed within the base material 130a. Each of the beads 143 has a relatively bigger size than each of the beads 141 shown in FIG. 11A.

Figure 11C:
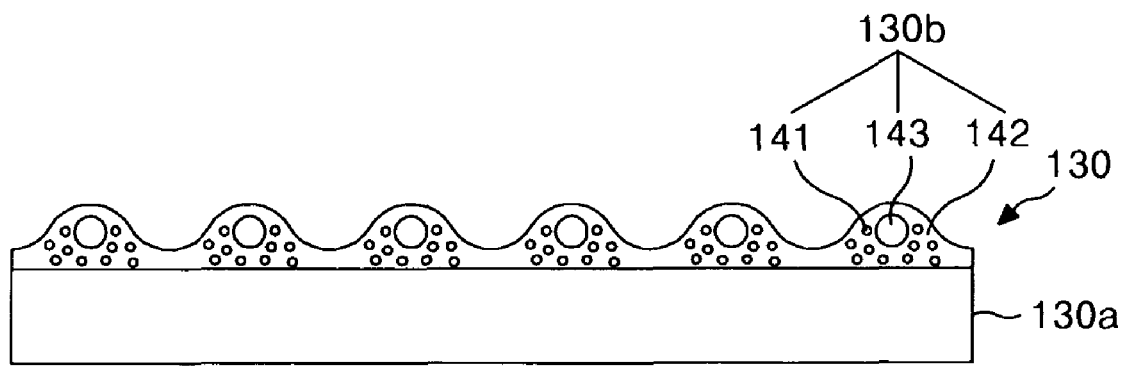
FIG. 11C is a cross-sectional view of still another exemplary light dispersion processing layer for the LCD device of FIG. 10.

FIG. 11C is a cross-sectional view of still another exemplary light dispersion processing layer for the LCD device of FIG. 10. Referring to FIG. 11C, the light dispersion processing layer 130 includes a base material 130a and a dispersion layer 130b on the base material 130a. The dispersion layer 130b includes a first plurality of beads 141, a second plurality of beads 143, and a binder 142 for holding the beads 141 and 143. Each of the beads 143 has a relatively bigger size than each of the beads 141.

The beads 141 and 143 shown in FIGS. 11A to 11C can be made of PMMA, vinyl chloride, acrylic resin, PC system, PET system, PE system, PS system, PP system, PI system resin, glass, silica, etc.

Figure 12A:
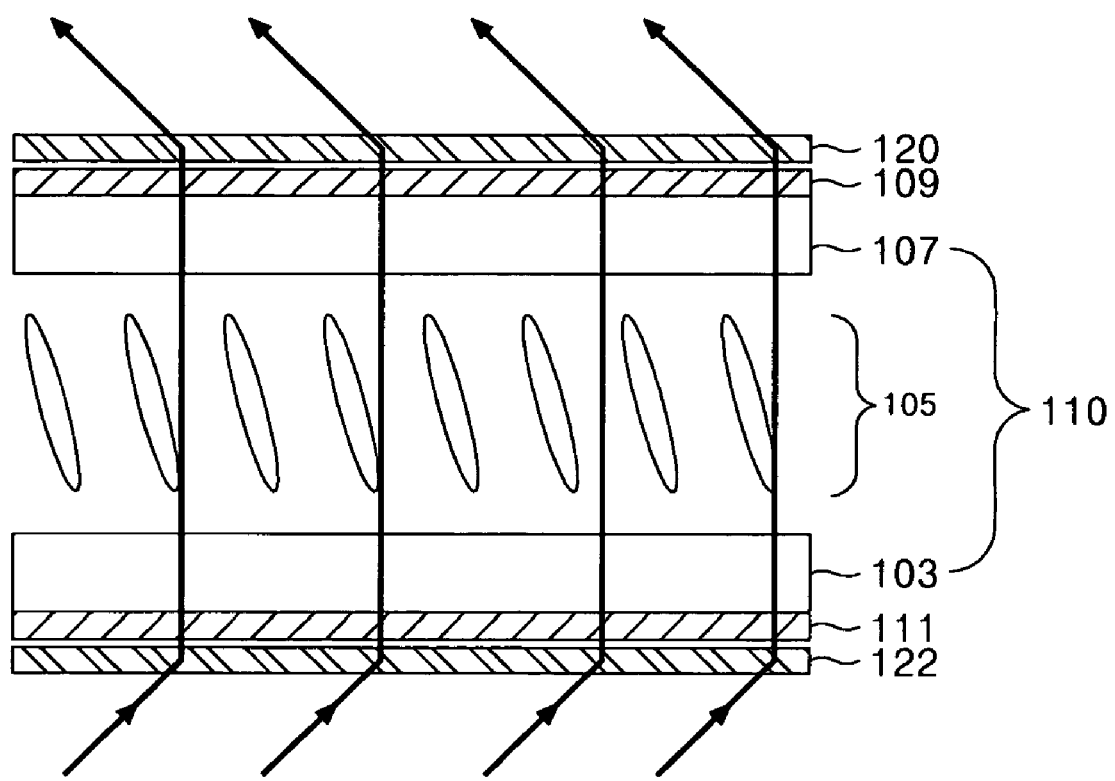
FIG. 12A is a schematic view of an exemplary liquid crystal display device according to a third embodiment of the present invention.

FIG. 12A is a schematic view of an exemplary liquid crystal display device according to a third embodiment of the present invention. Referring to FIG. 12A, a liquid crystal display device includes a TN mode LCD panel 110 having an upper substrate 107 and a lower substrate 103 with a liquid crystal layer 105 between the lower and upper substrates 103 and 107. An upper polarizer 109 is adhered to a light exit surface of the upper substrate 107, and a lower polarizer 111 is adhered to a light incidence surface of the lower substrate 103.

A first light path control film 120 is formed on the outer surface of the upper polarizer 109. A second light path control film 122 is formed on the outer surface of the lower polarizer 111. The first light path control film 120 controls the light transmitted through the liquid crystal display panel 110. The second light path control film 122 controls the light incident onto the lower polarizer 111. For example, the second light path control film 122 refracts the light incident at a lower viewing angle in the liquid crystal display panel direction. As a result, the light incident to the lower viewing angle is made to exit to the upper viewing angle, thereby improving the light efficiency.

Figure 12B:
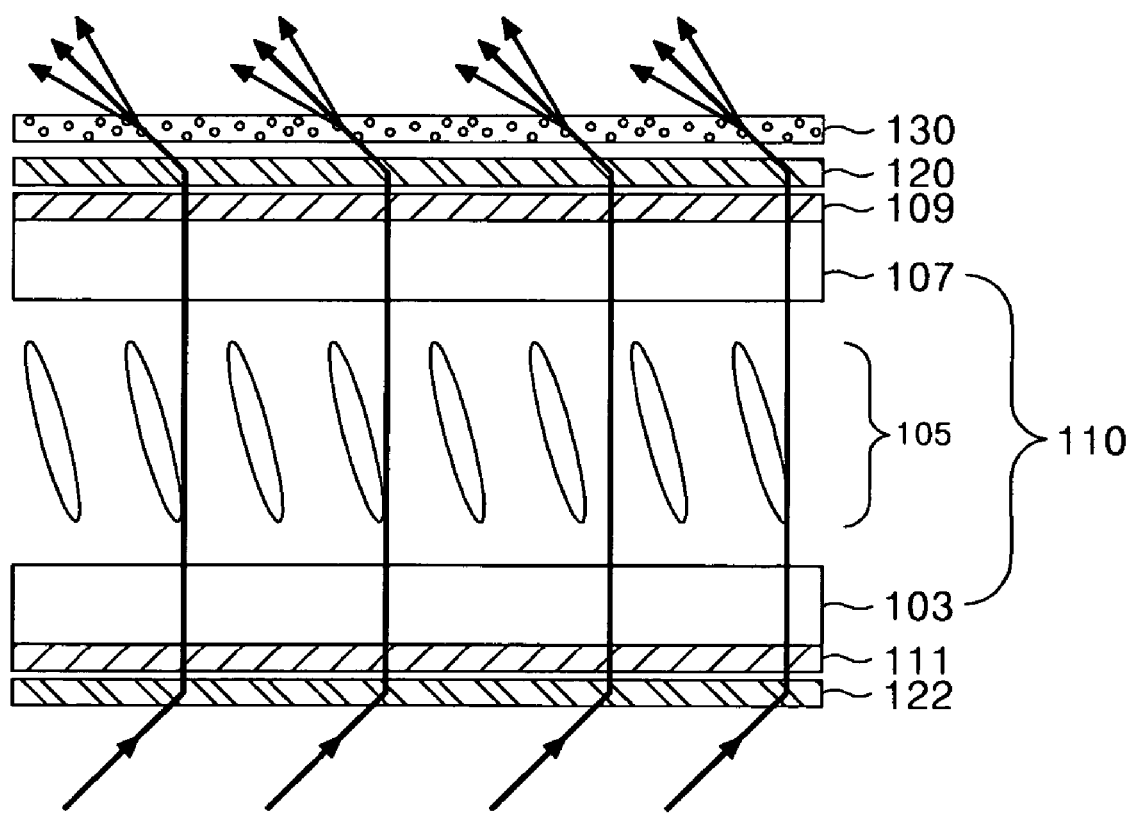
FIG. 12B is a schematic view of an exemplary liquid crystal display device according to a fourth embodiment of the present invention.

FIG. 12B is a schematic view of an exemplary liquid crystal display device according to a fourth embodiment of the present invention. Referring to FIG. 12B, a liquid crystal display device includes a TN mode LCD panel 110 having an upper substrate 107 and a lower substrate 103 with a liquid crystal layer 105 between the lower and upper substrates 103 and 107. An upper polarizer 109 is adhered to a light exit surface of the upper substrate 107, and a lower polarizer 111 is adhered to a light incidence surface of the lower substrate 103.

A first light path control film 120 is formed on the outer surface of the upper polarizer 109. A second light path control film 122 is formed on the outer surface of the lower polarizer 111. The first light path control film 120 controls the light transmitted through the liquid crystal display panel 110. The second light path control film 122 controls the light incident onto the lower polarizer 111.

A light dispersion processing layer 130 is provided on the light path control film 120. The light dispersion processing layer 130 distributes and disperses the light refracted by the light path control film 120. The light dispersion processing layer 130 includes a dispersing agent, such as a plurality of beads, and a binder to hold the beads. The binder is generally made of acrylic system or epoxy system.

According to the above-described embodiments of the present invention, the liquid crystal display device refracts light transmitted through the liquid crystal display panel in the lower direction of the liquid crystal display panel. Thus, the picture formed by the light transmitted in the short axis direction of an average director of the liquid crystal is perceived even at a viewing angle which is lower than that of the average director. Accordingly, the gray inversion generation area is reduced, thereby improving the picture quality.

It will be apparent to those skilled in the art that various modifications and variations can be made in the liquid crystal display device of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   a liquid crystal display panel;
   a first polarizer on a first surface of the liquid crystal display panel;
   a second polarizer on a second surface of the liquid crystal display panel;
   a first light path control film entirely formed on a first surface of the second polarizer to refract the light polarized by the second polarizer to only a lower direction at an outside of a display surface of the liquid crystal display panel in order to minimize a gray inversion on the display surface of the liquid crystal display panel; and
   a second light path control film on a first surface of the first polarizer to refract the light incident to the liquid crystal display panel,
   wherein each of the first and second light path control films includes a first base material and a second base material formed in a same layer and alternately deposited in a slanting line direction, and a refractive index of the first base material is different from that of the second base material, and
   wherein each of the first and second base materials includes at least one of PMMA, PET system, PS system, and PP system resin.

2. The liquid crystal display device according to claim 1, further comprising a light dispersion processing layer on a first surface of the first light path control film to disperse the refracted light.

3. The liquid crystal display device according to claim 2, wherein the light dispersion processing layer includes:
   a transparent base material; and
   a dispersion layer on the transparent base material.

4. The liquid crystal display device according to claim 3, wherein the dispersion layer includes:
   a plurality of beads for dispersing a light incident to the dispersion layer; and
   a binder for binding the beads.

5. The liquid crystal display device according to claim 4, wherein the plurality of beads includes at least one of a PMMA, a vinyl chloride, an acrylic resin, a PC system, a PET system, a PE system, a PS system, a PP system, a PI system, a glass and a silica.

6. The liquid crystal display device according to claim 4, wherein the plurality of beads includes at least a first bead and a second bead of a different size from the first bead.

7. The liquid crystal display device according to claim 2, wherein the light dispersion processing layer includes:
   a transparent base material; and
   a plurality of beads distributed within the transparent base material for dispersing light incident onto the beads.

8. The liquid crystal display device according to claim 1, wherein the liquid crystal display panel includes:
   a first substrate;
   a black matrix on the first substrate;
   a color filter on the black matrix;
   a common electrode on the color filter; and
   a second substrate attached to the first substrate with a liquid crystal layer therebetween and including a pixel electrode on the second substrate to generate a vertical electric field with the common electrode.

* * * * *